United States Patent [19]
Overbury et al.

[11] 4,353,163
[45] Oct. 12, 1982

[54] AUTOMATIC OILING SYSTEM FOR CHAIN SAW

[75] Inventors: Douglas G. Overbury; Colin Overy, both of Brockville, Canada

[73] Assignee: Black & Decker Inc., Newark, Del.

[21] Appl. No.: 201,416

[22] PCT Filed: Aug. 8, 1980

[86] PCT No.: PCT/US80/01008
   § 371 Date: Oct. 30, 1980
   § 102(e) Date: Oct. 30, 1980

[87] PCT Pub. No.: WO82/00508
   PCT Pub. Date: Feb. 18, 1982

[51] Int. Cl.³ .................. B27B 17/12; F16N 7/14; F16N 13/22
[52] U.S. Cl. .................. 30/123.4; 83/169; 137/543.13
[58] Field of Search .................. 30/123.4; 83/169; 137/543.13, 542

[56] References Cited

U.S. PATENT DOCUMENTS

| | | | |
|---|---|---|---|
| 2,650,626 | 9/1953 | Kiekhaefer | 30/123.4 |
| 2,699,179 | 1/1955 | Hansen | 137/543.13 X |
| 2,933,112 | 4/1960 | Bentley . | |
| 2,969,085 | 1/1961 | Nystrom | 137/543.13 X |
| 3,053,190 | 9/1962 | Carlson . | |
| 3,844,380 | 10/1974 | Batson | 184/15 R |
| 3,865,213 | 2/1975 | McDermott | 83/169 |
| 3,870,125 | 3/1975 | Gorski | 30/383 |
| 4,094,382 | 6/1978 | Lee | 30/123.4 |
| 4,132,289 | 1/1979 | Makela | 83/169 X |

Primary Examiner—Jimmy C. Peters
Attorney, Agent, or Firm—Harold Weinstein; Edward D. Murphy; Walter Ottesen

[57] ABSTRACT

A portable power driven chain saw (20) having an automatic oiling system (54) including an externally adjustable control valve (60) which meters an adjustable flow of oil (69) therethrough unidirectionally and to stop the flow in the valve when the chain saw (20) is stopped. An improved oil pump (58) is provided of the rotor (72) vane type. The adjustable member (124) of the control valve (60) has a longitudinal opening (130) for the flow of oil (69) therethrough to the guide bar (24), also the opening (130) slidably carries the stem (144) of the check valve (140) which provides for the unidirectional flow.

6 Claims, 12 Drawing Figures

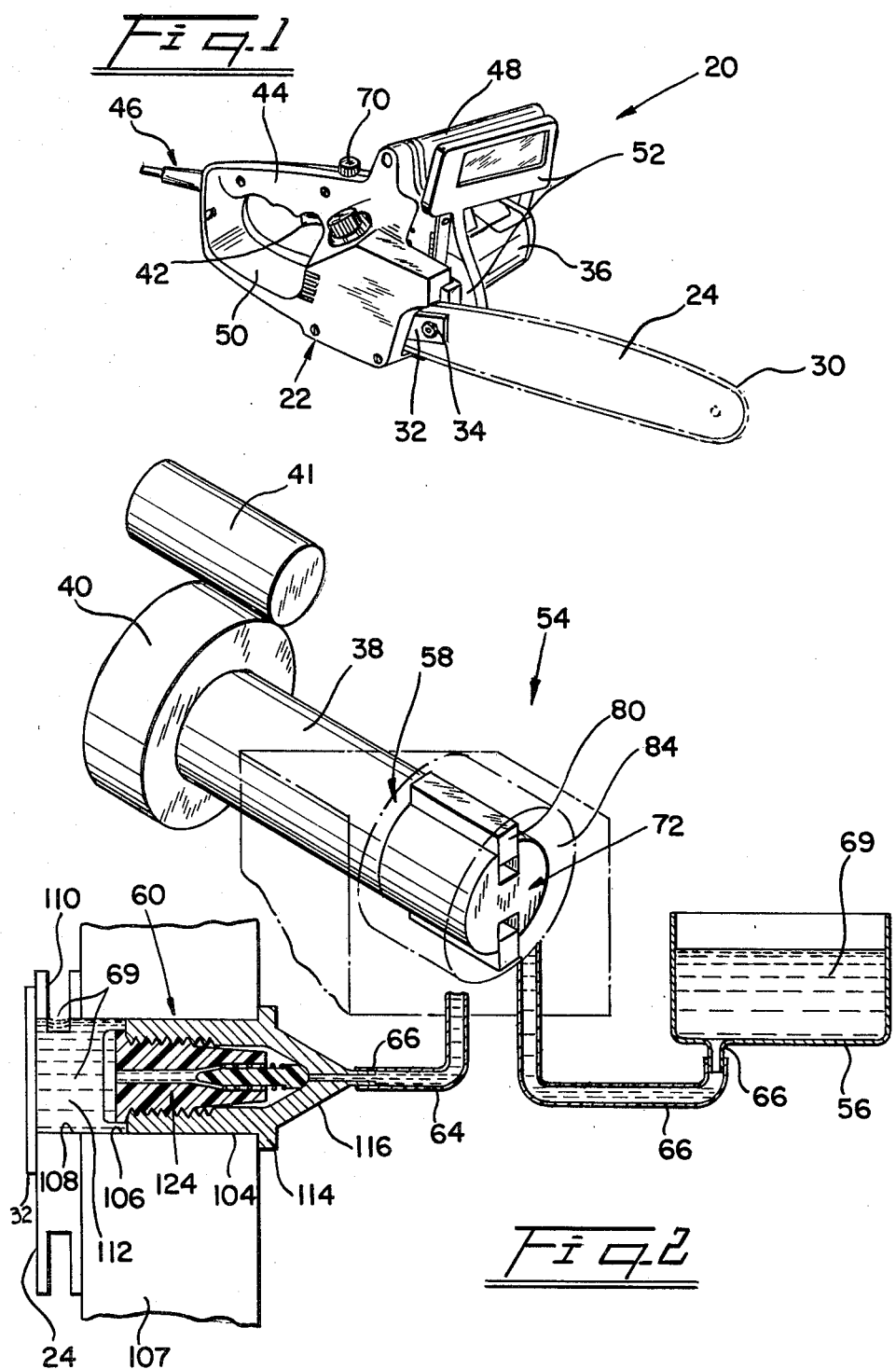

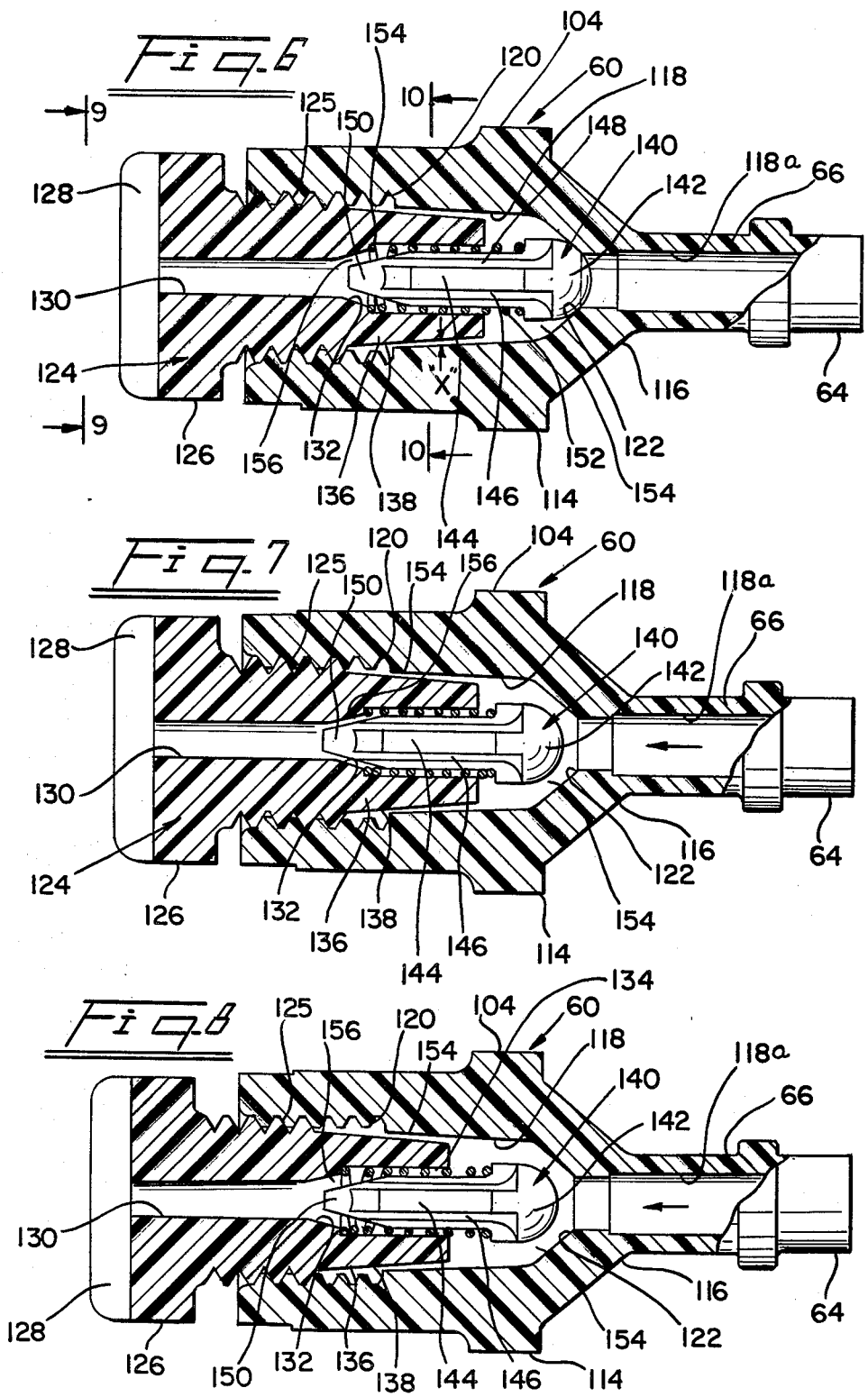

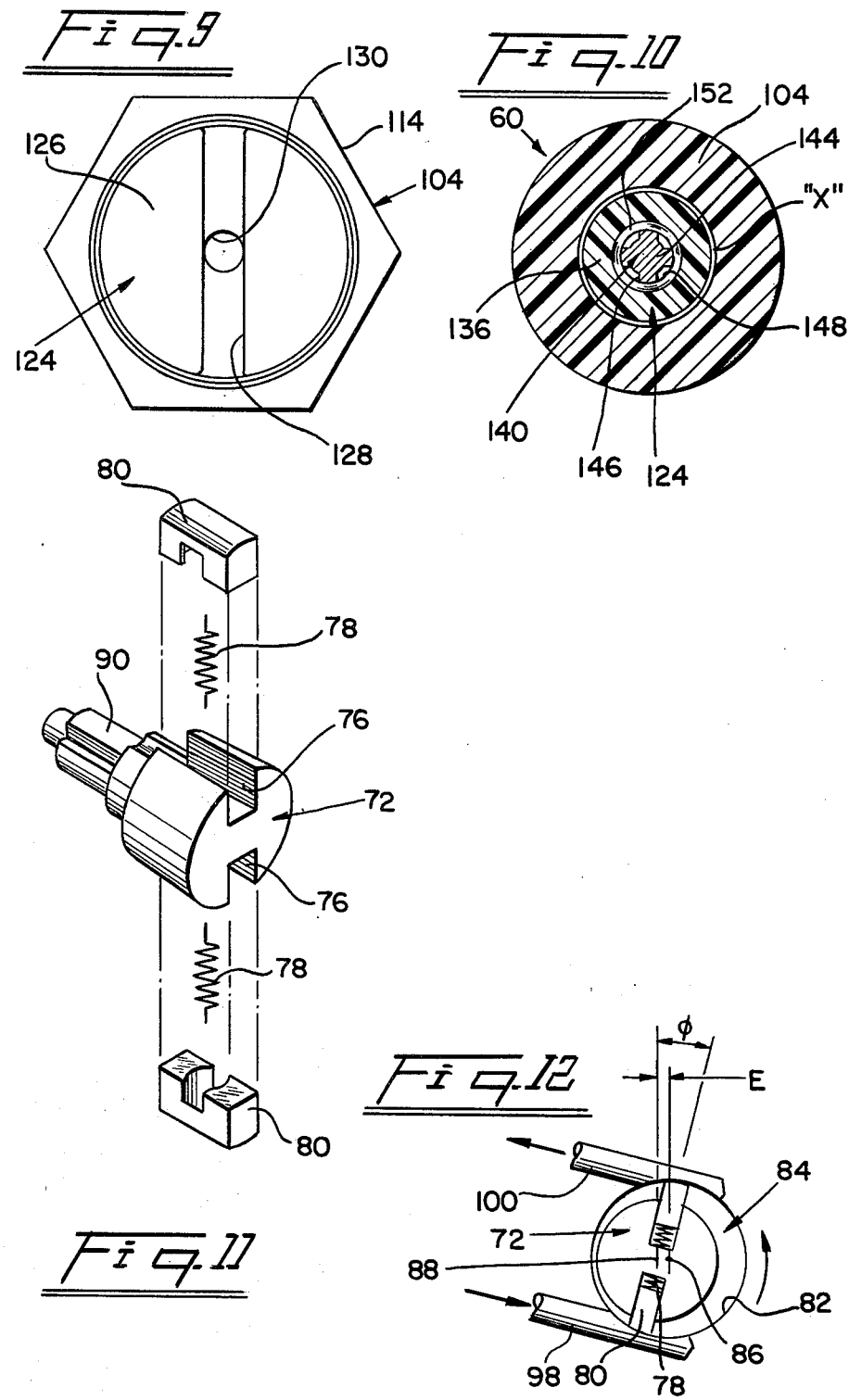

4,353,163

AUTOMATIC OILING SYSTEM FOR CHAIN SAW

BACKGROUND OF THE INVENTION

Heretofore oiling systems of prior art chain saws and the like used oil pumps carried or driven intermediately of the drive shaft and having complex valves such as alternately operative pairs of ball or check valves. Whenever an external adjustment was present, the flow was being remotely controlled and the oil was never being delivered at the point of adjustment.

SUMMARY OF THE INVENTION

It is an object of the present invention to provide an improved automatic oiling system for chain saw which overcomes the prior art disadvantages; which is simple, economical and reliable; which has an oil pump mounted at the end of the drive shaft; which pump has an eccentric rotor with yieldable vanes; which pump has parallel tangential inlet and outlet; which has oil flowing through an externally accessible adjustment member for the control valve; which has a unidirectionally control valve; which has a two position control member, one position being a check valve and the other position being to regulate the flow through a transition section; and which uses a spring biased unidirectional valve able to open a pre-set distance upon the pump operating and to coact with an adjustment member to regulate the flow of oil through said member.

Other objects and advantages will be apparent from the following description of the invention, and the novel features will be particularly pointed out hereinafter in the claims.

BRIEF DESCRIPTION OF THE DRAWINGS

This invention is illustrated in the accompanying drawings in which:

FIG. 1 is a perspective view of chain saw embodying the novel automatic oiling system of the present invention.

FIG. 2 is a schematic view of chain saw embodying the improved oiling system of the present invention.

FIG. 6 is an enlarged elevational view, partly in section, of the control valve of the present invention, being closed.

FIG. 7 is an enlarged elevational view, partly in section, of the control valve of the present invention, opened.

FIG. 8 is an enlarged elevational view, partly in section, of the control valve of the present invention, opened an additional turn of the adjusting screw.

FIG. 9 is an elevational view taken along line 9—9 of FIG. 6.

FIG. 10 is a sectional, elevational view taken along line 10—10 of FIG. 6.

FIG. 11 is an exploded perspective view of the oil pump of the present invention.

FIG. 12 is a schematic, elevational view of the oil pump of the present invention.

DESCRIPTION OF THE INVENTION

Figure 3:
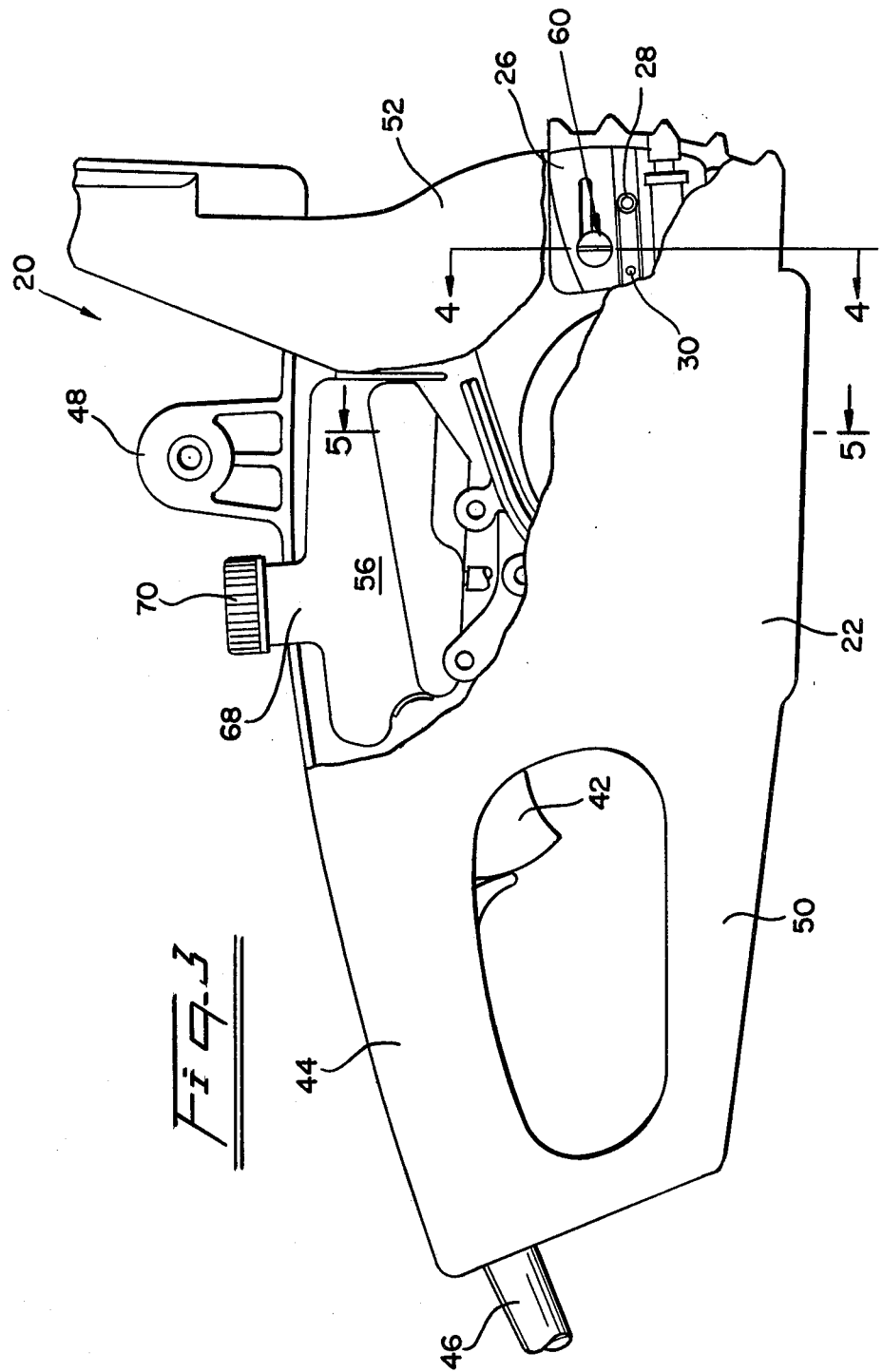
FIG. 3 is an elevational view, partially cut away, showing the location of oiling tank and control valve, respectively.

A portable power driven chain saw designated generally 20 is shown in FIG. 1 and embodies the present invention. The chain saw 20 has a housing 22 from which a guide bar 24 extends forwardly therefrom, and is mounted to the housing at a guide pad 26 by means of a stud 28 and guide pin 30 and over which is affixed a cover plate 32 with a nut 34 threaded to the stud 28, as shown in FIGS. 1 and 3. An endless saw chain 30 is entrained on the guide bar 24 to be driven by a suitable motive means as, for example, an electric motor (not shown) housed in a motor casing 36 to drive an output shaft 38 illustrated in FIGS. 2 and 5 through a gear 40 from a motor pinion 41.

The motor is energizable by a trigger switch 42 mounted in a rear handle 44 and connected to a source of electricity by an electric cord 46. The housing 22 has a transverse top handle 48 which combined with handle 44 permits the chain saw 20 to be easily held and controlled during operation. The handle 44 is enclosed and widened at the bottom thereof by a lower portion 50 which protects the operator's hand from beneath. Forwardly of top handle 48 is a brake lever 52 shown in FIG. 1 in the non-braking position which, when pivoted clockwise toward the guide bar 24, will actuate a braking means (not shown) and abruptly stop the rotation of saw chain 30.

Figure 5:
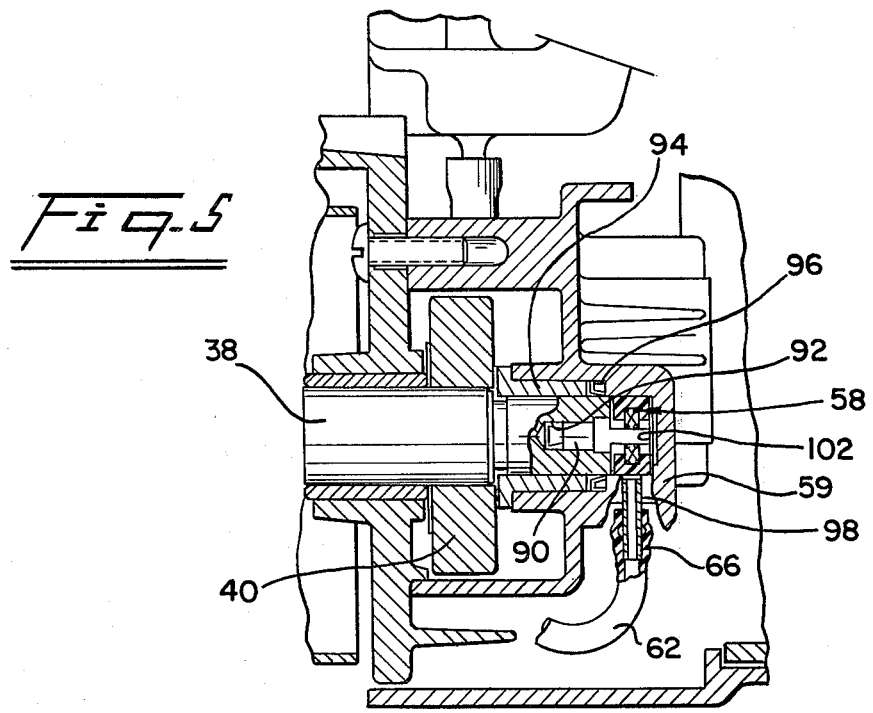
FIG. 5 is an elevational view, partly in section, taken along line 5—5 of FIG. 3, showing the oil pump.

The oiling system 54 of the present invention is shown schematically in FIG. 2 to include an oil tank 56, an oil pump 58 and a control valve 60, with flexible tubing 62 connecting the tank 56 to the pump 58, and the flexible tubing 64 connecting the pump 58 and the valve 60. The tubing 62 and 64 is the same diameter and will have its end stretched over a nipple 66 as shown in FIGS. 2, 5 and 6 as having an enlarged collar inwardly of the tip and over which the end is forced to prevent accidental dislodging of the tubing from the nipple. The oiling system is low pressure; but, if desired, suitable clamps could be used to secure the tubing to the nipples.

The oil tank 56 shown in FIGS. 2 and 3 is shaped to nest in the housing 22 with a neck 68 extending therefrom to be closed by a removable cap 70 which may have a vent (not shown) and be depressable to prime the pump 58, if need be. Oil 69 may be added to the tank 56 upon removal of the cap 70.

The oil pump 58 illustrated in FIGS. 2, 5, 11 and 12 in the preferred embodiment of the invention is a positive displacement pump of the yieldable vane type housing in a casing 59 and having a rotor 72 having a cylindrical head 74 which has two diametrically opposed slots 76 in which springs 78 are disposed below vanes 80 which are slidingly carried in the slots 76 to be urged radially outwardly to yieldably engage a cylindrical wall 82 of a chamber 84 having an axis 86. The axis 88 of the rotor 72 is offset by an eccentric distance "E" which in this embodiment equals 0.020 inches. The rotor has a stepped down slabbed shank 90 which is force fit into a bore 92 shown in FIG. 5 extending into the shaft 38 from the end face thereof. The shaft 38 is journalled in a sleeve bearing 94 affixed in the housing 22 with an oil seal 96 disposed between the bearing 94 and the oil pump 58. The axis of the bore 92 is coincident to the axis 88 of the rotor in that it is formed eccentrically to the shaft axis coincident to the chamber axis 86. The eccentricity of the rotor 72 with the chamber 84 provides for the pumping action. The direction of rotation shown in FIG. 12 as counterclockwise will pump the oil in surges from the inlet 98 to the outlet 100. The inlet 98 and outlet 100 are parallel to each other and tangentially connected to the chamber wall 82. The inlet 98 and outlet 100 are located at an angle φ which in the preferred embodiment equals 6.5° from the direction of the eccentric. The chamber 84 has a closed bottom 102 and an open end adjacent to the face end of the shaft 38. So that high pressures in the oiling system do not become a problem, the oil pump 58 is designed to generate a low pressure of between 5 to 10 psi at 4000 rpm with SAE 30 oil and deliver 2 to 3 cc per minute.

The control valve 60 illustrated in FIGS. 2, 4, 6, 7 and 8 has a tubular valve housing 104 the outer diameter of which fits tightly within or may be cemented to a circular aperture 106 formed in an external wall of the gearcase 107 of the housing 22. The aperture 106 is aligned with an aperture 108 of the guide bar 24 which extends therethrough and is in communication at the top thereof with the restraining track 110 about which the saw chain 30 will be guided as it rotates endlessly about guide bar 24, being driven by power from the motor. The outboard end of the aperture 108 is sealed by the cover plate 32 to form an oil pocket 112 which during operation of the oiling system 54 will fill with oil that is delivered to the track 110 to lubricate the saw chain 30. The inboard end of the housing 104 has an external flange 114 which holds against the gearcase 107 to permit the housing to be fully inserted into the aperture 106 wherein it is held a short distance from the other end of the opening. The housing necks down in a conical section 116 to terminate in a nipple 66 to which is connected the outlet tube 64 which delivers oil from the oil pump 58. The housing 104 has an internal passage 118 which is threaded at section 120 and has a reduced diameter which ends at a reduced passage 118a which extends the length of the nipple 66. A valve seat 122 is formed about the passage 118a at the narrow end of the necked-down portion 116.

Figure 4:
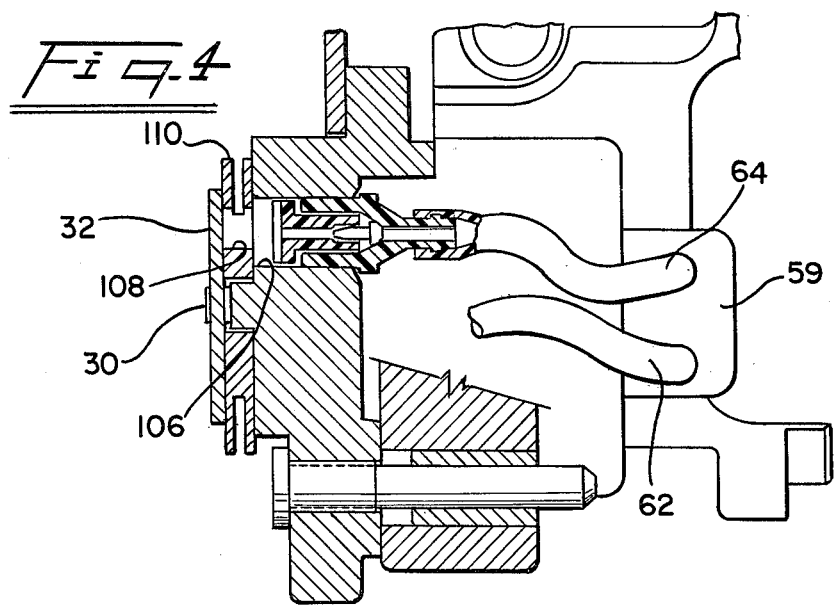
FIG. 4 is an elevational view, partly in section, taken along line 4—4 of FIG. 3, showing the control valve.

An adjustment member or screw 124 with threads 125 that are threadedly received in the housing 104 as shown in FIGS. 2, 4 and 6. The member 124 has a head 126 with a straight slot 128 formed on the diameter as seen in FIGS. 6 and 9. A longitudinal opening 130 is formed axially of the member so that its outboard end lies within the slot 128 which thereby serves as a flow guide and partial hood. The opening 130 flares radially outwardly at a transition section 132 which terminates in an enlarged diameter section 134. The head 126 is joined by a shank 136 which carries the threads 125 to about the area adjacent to the transition section 132 and will have a smooth inwardly flared unthreaded section 138 extending to the end of the shank 136 therefrom. A space "X" shown in FIGS. 6 and 10 is formed between the lower unthreaded shank 136 section 138 and the housing passage 118.

A check valve 140 has an enlarged rounded head 142 which is joined by a stem 144 having splines 146 between which are formed oil channels 148. The splines 146 are tapered at their ends as is the tip 150 of the stem 144. The slope of the taper of the tip 150 corresponds to that of the transition section 132. A spring 152 is disposed about the stem 144 to have one end engage the underside of the head 142 and the other side abut a shoulder 154 formed about the flared out end of the transition section 132.

The control valve 60 is depicted in various stages of operation in FIGS. 6, 7 and 8 wherein FIG. 6 shows the check valve 140 closed by the bias of the spring 152 wherein the head 142 engages the seat 122 to shut off the passage 118 from the passage 118a, thereby sealing the oiling system 54 from the backflow of oil and dirt. The spring 152 is tensioned to yield upon the pressure of the oiling system 54 via the oil pump 58 developing substantially 0.5 psi in the oil 69, which will occur a short time after the motor is energized. Once the oil 69 pressure reaches 0.5 psi or greater, the check valve 140 will open a predetermined distance 154 as illustrated in FIG. 7. The distance 154 will remain substantially constant so long as the oil pump 58 continues to pump oil 69 in continuous surges to the control valve 60. The oil 69 enters the passage 118 to flow through the channels 148 and be discharged from the opening 130 wherein it enters the pocket 112 for collection and delivery to the track 110 (FIGS. 2 and 4).

Whenever a change in flow is desired, the cover plate 32 will be removed, and the guide bar 24 also may be removed to expose the aperture 106 wherein a flat blade screwdriver will turn the screw 124 to increase or decrease the oil 69 flow. FIG. 8 shows the screw 124 rotated one turn to increase the opening at the transition section 132 wherein a control passage 156 formed between the tip 150 and the transition section 132. The passage 156 of FIG. 7 was smaller than that shown in FIG. 8. The stem 144 is shown in substantially the same "open" position in FIGS. 7 and 8. Accordingly, the oil flow can only be adjusted via the screw 124 being rotated relative the fixed housing 104. Thus, the flow of oil 69 is not only adjusted by but also flows through to be discharged from the adjustment member 124 of the control valve 60.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A valve assembly for an oil pumping system of a chain saw having a guide bar comprising:
   (a) a housing having a passage therethrough in communication between the guide bar and the oil pumping system,
   (b) an adjustment member connected in the passage of the housing to regulate the quantity of oil delivered to the guide bar,
   (c) said member having a longitudinal opening therein through which the oil is delivered to the guide bar, and
   (d) a check valve operatively disposed in the passage of the housing and having an open position permitting oil flow, and a closed position stopping oil flow whenever the oil pumping system is off,
   (e) the check valve in the open position to coact with the adjustment member to define a transition section to regulate the flow of oil into the opening of the adjustment member from which the flow exits the valve assembly,
   (f) the adjustment member defining a screw threadedly received in the housing,
   (g) the screw having a slotted head disposed externally of the housing whereby rotation thereof changes the transition section,
   (h) the longitudinal opening extending through the screw to open into and communicate with the slotted head thereof, (i) the upstream side of the passage having a restriction therein, (j) the check valve having a head positionable to close the restriction and prevent communication from the passage to the upstream side, (k) a spring biasing the check valve toward the restriction and yieldable to permit a pre-set opening of the head upon oil being pumped by the pumping system, and (l) the check valve having a stem extending from the head in the direction of the downstream side.

2. The combination claimed in claim 1 wherein:

(a) the opening of the adjustment member having an enlarged diameter section remote from the slotted head thereof, (b) the stem of the check valve slidably disposed in the enlarged diameter section, (c) at least one spline formed on the stem to permit the passage of oil, and (d) the transition section formed between the stem and the opening of the adjustment member.

3. The combination claimed in claim 2 wherein:

(a) the check valve positionable between an open position and a closed position responsive to the pumping system being on or off, (b) the stem location remains substantially constant responsive to the substantial constant pressure of the pumping system when on, and (c) the adjustment member longitudinally shiftable relative to the housing and the stem to change the cross-sectional area of the transition section whereby the flow of oil therethrough may be increased or decreased responsive to the positioning of the adjustment member within the housing.

4. An oil pumping system for a chain saw comprising:

(a) a housing, (b) a chamber formed in the housing, having an annular wall, and one side thereof open and the other side thereof closed, (c) a drive shaft journaled in the housing to cover the open side of the chamber and spaced from the closed side thereof, (d) a bore extending into the shaft from the face end thereof with its axis offset from the chamber axis by a predetermined distance, (e) a rotor fixedly connected in the bore and disposed in the chamber to rotate eccentrically therein during shaft rotation, (f) a plurality of yieldable vanes operatively associated with the rotor with the ends thereof remaining in continuous contact with the annular wall of the chamber to develop a pressure therein upon rotation of the shaft and rotor, (g) an inlet connected to the wall to deliver oil to the chamber, (h) an outlet connected to the wall opposite the inlet to discharge oil from the chamber, (i) a control valve to pass a metered flow of oil therethrough from the outlet, and (j) the control valve to close upon pressure ceasing in the chamber when the rotor stops rotation therein.

5. The combination claimed in claim 4 wherein:

(a) the inlet connected tangentially to the wall, and (b) the outlet connected tangentially to the wall on the side thereof opposite the inlet.

6. The combination claimed in claim 5 wherein:

(a) the inlet and the outlet are connected to the wall in parallel relationship to each other and each lie on one side of the axis of the chamber.

* * * * *